Dec. 12, 1933.   R. C. BERGVALL   1,939,035
VARIABLE VOLTAGE LIGHTNING ARRESTER
Filed May 1, 1930
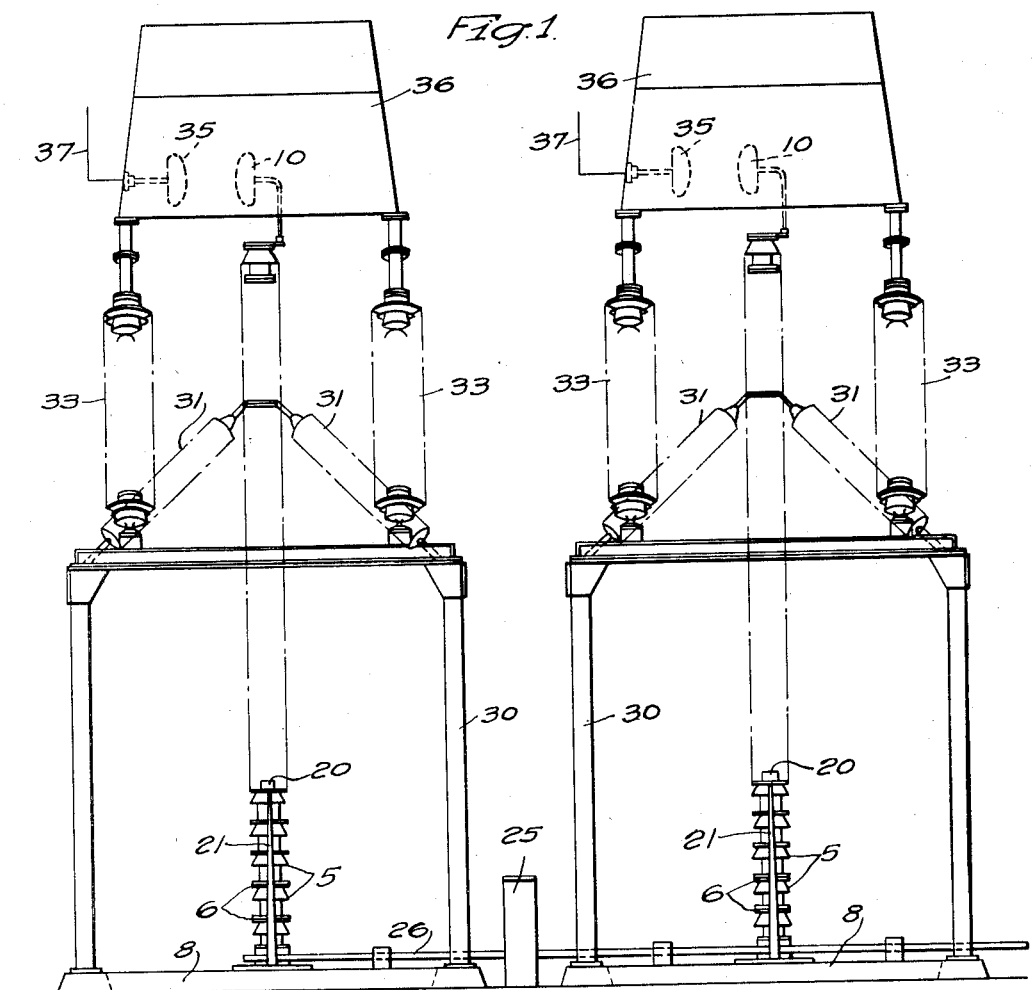
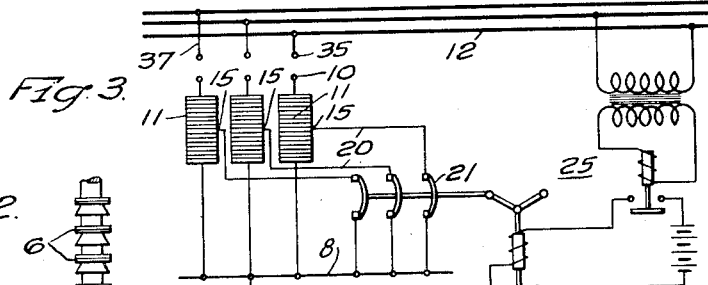
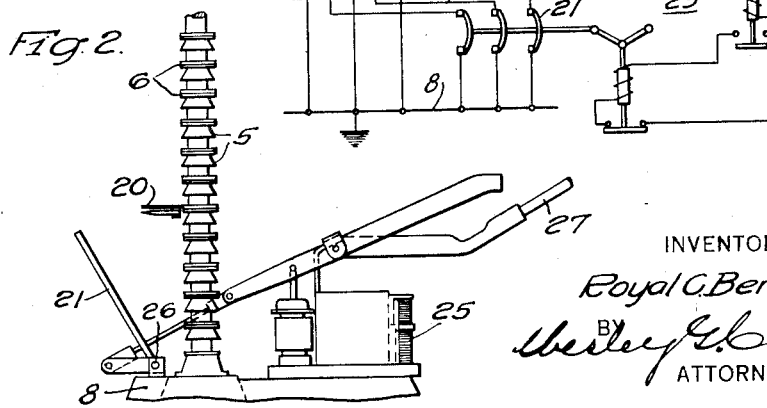
INVENTOR
Royal C. Bergvall.
BY
ATTORNEY Patented Dec. 12, 1933

1,939,035

UNITED STATES PATENT OFFICE 1,939,035

VARIABLE-VOLTAGE LIGHTNING ARRESTER

Royal C. Bergvall, Wilkinsburg, Pa., assignor to Westinghouse Electric & Manufacturing Company, a corporation of Pennsylvania Application May 1, 1930. Serial No. 448,830

12 Claims. (Cl. 175—30)

My invention relates to lightning arresters and more particularly to lightning arresters having switches to vary the critical voltages of the arresters.

Prior to my invention, electrical apparatus, particularly transmission systems fed by water-wheel generators, which are subject to serious dynamic over-voltages, have been hard to protect against lightning surges. This has been particularly true since it is necessary to provide lightning arresters having critical voltages sufficiently high to prevent flashovers and consequent damage to the arresters during periods of dynamic over-voltages.

Generators, particularly those operated by water-wheels, are subject to over-voltages when the loads are suddenly removed. Part of the over-voltage is caused by the inherent regulation of the apparatus and part by the speeding up of the generator before the governor can act to reduce the energy input. This is most serious in a water-wheel-driven generator as water is substantially noncompressible and a too-rapid closing of the gate would have serious consequences. As a result of this, water-wheel generators and the connected apparatus are constructed to withstand the electrical and mechanical stresses that result from such "run away".

As over-voltages frequently reach 200% of normal voltage, it has been necessary to provide lightning arresters of a rating equal to this dynamic over voltage with a corresponding decrease in the protection value of the arrester else risk arrester failure.

According to my invention the arrester is built up of a sufficient number of units connected in series to withstand the maximum dynamic over-voltage, such as that which results when a breaker is opened at full load on a system supplied by a generator driven by a water-wheel. However, under normal operating conditions, serious surges can exist on the system without the arrester dissipating or reducing said surges to a safe value.

In order to reduce critical voltage of the arrester to a value low enough to protect the line from surges while operating at normal potential, I provide a short-circuiting switch for a portion of the stack of arrester elements.

While the arrester may be of any desired design, depending on location and load conditions, I have shown a typical outdoor installation as most clearly illustrating my invention.

It is an object of my invention to provide a lightning arrester having a variable critical voltage.

Other objects and advantages will be apparent from the following detailed description, taken in conjunction with the appended drawing in which Figure 1 is an elevation of a portion of an installation embodying my invention and, Fig. 2 is a fragmentary view of an arrester embodying my invention.

Fig. 3 is a schematic diagram showing my invention.

The apparatus disclosed in the drawing comprises a stack of ceramic elements 5 coupled together with tight joints 6, usually metal collars belted, screwed or soldered together. The bottom of the stack is firmly grounded on a metal bed plate 8. Mounted on the top of the stack, is one element 10 of a suitable spark-gap, preferably of the "door-knob" type. Located in the stack, is a plurality of valve-type arrester element 11, preferably of the auto-valve or porous block type, connected in series to have a total critical voltage sufficient to protect the apparatus 12 to which it is connected against dynamic or "run-away" over-voltage.

At any desirable point, as 15, a lead or tap 20 is connected to each of the stacks of elements 11. The point 15 is so selected that the arrester elements above it will have a critical voltage or potential sufficiently high to afford proper protection to the system during the prevalence of normal potential or voltage on the system.

A switch 21, capable of being connected to, or disengaged from, the tap 20, is firmly grounded on the bed plate 8 so that, when the switch 21, is open the total of the valve elements are in use and, when the switch is closed, a portion of the elements are short circuited. In this manner, the critical potential of the arrester may be changed at will. If desired, a plurality of taps may be brought out from the series-connected valve elements so that the critical voltage may be changed in any desired number of steps.

The switch 21 is controlled by a quick-acting over-voltage relay 25. The relay 25 may be connected to the system in any desired manner and is preferably set to operate at one hundred and twenty percent (120%) of normal voltage, and the switch should be fully opened in one half second or less, after the dynamic voltage has reached the tripping value, depending upon the voltage-rise characteristic curve of the system to which it is connected.

Each individual switch may be provided with a tripping relay but I prefer to supply an arrester stack and a short circuiting switch 21 for each conductor of the system, and interconnect the various switches with a common connecting rod 26 which is actuated by the relay 25.

A relay (not shown) may be provided to reset the relay 25 and reclose the switch 21, but, as manual attention is generally required before the generator which has run away can be put back on the line, I prefer to provide a manual reclosing handle 27.

For purposes of rigidity I usually provide a framework 30 made of any suitable material, such as structural steel. The stack is guyed to this framework by suitable insulator strings 31. The framework 30 also supports, on suitable insulators 33, the other half 35 of the spark gap which is enclosed in a suitable housing 36. The gap elements 35 are connected to the system to be protected by any desired feeder 37.

The term "critical potential", as used in this specification, refers to the operating potential of the arrester and includes the starting voltage or the potential at which the valves begin to operate, the ceiling voltage or the potential at which the surge energy is dissipated and its cut off or final potential at which energy ceases to flow through the arrester. The starting and ceiling voltages are materially higher than the maximum or peak of the generator voltage while the cut off approaches very near to the maximum of the generated voltage and is preferably slightly higher than the maximum of the generated voltage so that no power arcing resulting in damage to the arrester will take place because of the generated voltage.

In operation, my arrester will be provided with the proper number of elements to give the desired maximum protection, and a tap or taps brought out to provide normal operating protection. The relay will be set to operate at any desired dynamic over-voltage, and the short circuiting switches are closed. Then, so long as no dynamic over-voltage exists on the system, the arrester will afford the necessary low resistance to surges to dissipate the same. However, upon the occurrence of an over-voltage of a predetermined amount the relay will trip and open the switches to increase the critical potential of the arrester and prevent power arcing through the arrester during the prevalence of the over-voltage.

I do not desire to restrict myself to the specific embodiment of my invention herein shown and described, since it is apparent that it may be changed and modified without departing from the spirit and scope of my invention as defined in the appended claims.

I claim as my invention:

1. A protection device for an electrical system which comprises a valve-type discharge device having a sufficient number of units to withstand maximum overvoltage on said system, a switch, a maximum voltage relay for controlling said switch, said switch, when closed, short-circuiting a sufficient number of said units to make said arrester efficient for normal voltage conditions on said system and, when open, inserting a sufficient number of units to withstand maximum overvoltage on said system.

2. A protective device for an electrical system comprising a valve-type discharge device having a plurality of series connected units and means responsive to dynamic voltage conditions on said system for varying the number of effective units and hence the critical voltage of said discharge device.

3. A protective device for an electrical system comprising a valve-type discharge device connected to said system, said device comprising a plurality of elements having a total critical voltage of sufficient value to protect the system during maximum dynamic over-voltages, a switch for short-circuiting a predetermined number of said elements to reduce the critical voltage, and an over-voltage relay to open said switch upon increase of dynamic voltage on said system.

4. A protective device for an electrical system comprising a valve-type lightning arrester composed of a plurality of elements, said arrester having a critical potential of such a value as to protect the system during the prevalence of dynamic over-voltage on said system, means for making inactive a predetermined section of said elements in order to lower the critical potential of said arrester to properly protect said system during the prevalence of rated potential on said system and means for restoring said section to activity upon the occurrence of a dynamic over-voltage on said system.

5. In combination with an electrical system subject to generator over-voltage, a protective device comprising a valve-type lightning arrester having a critical voltage sufficiently high to protect the system during over-voltage, means for reducing the critical voltage of said arrester during the prevalence of normal generator voltage on said system, and means for restoring the critical voltage of the arrester upon a predetermined increase of generator voltage.

6. An electrical system comprising a generator subject to run-away, a protective device comprising a valve-type lightning arrester having a critical voltage of such value as to protect the system during run-away, means for making inactive a portion of said arrester during normal voltage on said system and means to restore said portion to activity upon run-away of said generator.

7. A protective means for a system subject to high dynamic over-voltage which comprises an arrester of sufficient size to protect the system during the over-voltage, means for short-circuiting a portion of said arrester during normal dynamic voltage and means controlled by the dynamic voltage for opening said short-circuiting means during periods of dynamic over-voltage.

8. A protective means for a system subject to high dynamic over-voltage which comprises an arrester of sufficient size to protect the system during over-voltage, means for short-circuiting a portion of said arrester during normal dynamic voltage, and means for opening said short-circuiting means during periods of dynamic over-voltage.

9. In combination with a transmission system subject to high generator over-voltages, a lightning arrester having sufficient total capacity to provide protection to said system during the duration of said over-voltage, and means for cutting out a portion of said arrester during prevalence of normal voltage on said system.

10. A protective device for an electrical system subject to over-voltages caused by run away of a generator, which comprises a multiple-unit current-discharging means of sufficient capacity to protect said system during prevalence of said over-voltage, means for making inactive a portion of said means during periods of normal voltage on said system and means for restoring said means to activity upon an occurrence of over-voltage on said system.

11. The combination of an electrical apparatus having a fixed dynamic normal voltage and an abnormal dynamic over-voltage under certain conditions, said apparatus being also subject to transient excess-voltage surges, and means for protecting said apparatus against transient excess-voltage surges during normal operating conditions, characterized by a lightning arrester comprising a plurality of valve-type lightning-arrester elements in series, the number of said elements corresponding to the abnormal dynamic over-voltage of the apparatus, and a switch for by-passing a sufficient number of said lightning-arrester elements to reduce the valve voltage of the remaining elements to the proper rating for the normal dynamic voltage of the apparatus.

12. The combination of an electrical apparatus having a fixed dynamic normal voltage and an abnormal dynamic over-voltage under certain conditions, said apparatus being also subject to transient excess-voltage surges, and means for protecting said apparatus against transient excess-voltage surges during normal operating conditions, characterized by a lightning arrester comprising a plurality of valve-type lightning-arrester elements in series, the number of said elements corresponding to the abnormal dynamic over-voltage of the apparatus, and a circuit-breaker, opening in response to a predetermined abnormal dynamic over-voltage of the apparatus for normally by-passing a sufficient number of said lightning-arrester elements to cause the valve voltage of the remaining elements to be of the proper value for the normal dynamic voltage of the apparatus.

ROYAL C. BERGVALL.